(12) United States Patent
Dassanayake et al.

(10) Patent No.: US 7,540,638 B2
(45) Date of Patent: Jun. 2, 2009

(54) ADAPTIVE FRONT LIGHTING SYSTEM FOR A VEHICLE

(75) Inventors: Mahendra Dassanayake, Bloomfield Hills, MI (US); Robert Miller, Belleville, MI (US); Sleiman Abdelnour, Macomb, MI (US); Michael S. Wrobel, Jr., Brownstown, MI (US); Jeffery Shannon, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 147 days.

(21) Appl. No.: 11/558,726

(22) Filed: Nov. 10, 2006

(65) Prior Publication Data

US 2008/0112173 A1 May 15, 2008

(51) Int. Cl.
*B60Q 1/00* (2006.01)
(52) U.S. Cl. .................. 362/465; 362/466; 362/545
(58) Field of Classification Search ........... 362/496, 362/498, 507, 544, 545
See application file for complete search history.

(56) References Cited

U.S. PATENT DOCUMENTS

| | | | |
|---|---|---|---|
| 5,365,412 A | 11/1994 | Koppolu et al. | |
| 5,550,716 A | 8/1996 | Dassanayake et al. | |
| 5,779,341 A | 7/1998 | Chinniah et al. | |
| 6,953,274 B2 | 10/2005 | Rice | |
| 7,201,507 B2 * | 4/2007 | Takeda et al. | 362/545 |
| 7,261,448 B2 * | 8/2007 | Ishida et al. | 362/507 |
| 7,427,151 B2 * | 9/2008 | Okubo et al. | 362/545 |
| 2004/0114379 A1 | 6/2004 | Miller et al. | |
| 2004/0179366 A1 * | 9/2004 | Takeda et al. | 362/464 |
| 2004/0179367 A1 | 9/2004 | Takeda et al. | |

FOREIGN PATENT DOCUMENTS

| | | |
|---|---|---|
| GB | 2 347 996 | 9/2000 |
| WO | 2007025931 | 3/2007 |

OTHER PUBLICATIONS

Mahendra Dassanayake, Photo Of Ford Advanced Concept Display at the Jan. 2004 North American Auto Show, 1 page.
Search Report for the corresponding Great Britain Patent Application No. GB 0722022.1 mailed Mar. 7, 2008.

* cited by examiner

*Primary Examiner*—Thomas M Sember
(74) *Attorney, Agent, or Firm*—Frank A. MacKenzie; Brooks Kushman P.C.

(57) ABSTRACT

An adaptive front headlamp assembly capable of down the road illumination and peripheral and foreground illumination is provided. The headlamp assembly comprises a housing adapted for stationary mounting to the vehicle. A stationary primary lighting module disposed within the housing and configured for down the road illumination. A stationary adaptive front lighting module disposed within the housing, configured for peripheral and foreground illumination, includes a plurality of LED light sources capable of emitting light in response to the vehicle's turning radius.

20 Claims, 7 Drawing Sheets

ADAPTIVE FRONT LIGHTING SYSTEM FOR A VEHICLE

BACKGROUND OF THE INVENTION

1. Field of the Invention

The present invention relates generally to an adaptive front lighting system (AFS) and an AFS headlamp assembly for a vehicle.

2. Background Art

Automotive forward lighting system designs have been modified over the years to increase driving safety. As safety has become a paramount concern of automotive lighting designers, designers have sought ways to make the automotive forward lighting beam more adaptive to changing driving conditions encountered by vehicles on the road. In response to these safety concerns, it has become desirable to adjust an automotive forward lighting beam relative to the vehicle. For example, when a vehicle is driving around a corner, it may be desirable for the vehicle's forward lighting beam to be adjusted such that the emitted light better illuminates the roadway around the corner. Additionally, adverse weather conditions, the presence of oncoming traffic, the driving environment, or an increase or decrease in the vehicle's speed may also result in circumstances where an adjustment of the vehicle's forward lighting beam may become desirable. In these situations, the forward lighting beam pattern is adjusted to increase the illumination of the road and/or the visibility of the driver in order to increase safety.

Automotive headlamp systems that can be adjusted in this manner are generally known in the industry as adaptive front lighting systems (AFS). AFS for conventional or projector headlamps generally adjust emitted light beam patterns by moving the entire lamp assembly. Alternatively, such systems may accomplish AFS functionality by moving the lamp reflector or the lens. When these methods accomplish AFS functionality, they may cause other problems within the lighting system. For example, laterally moving the entire lamp assembly may distort the assembly's beam pattern from its original shape and decrease the visibility of the driver. This can cause the emitting light to become noncompliant with applicable governmental regulations on automotive forward lighting systems. Additionally, when moving the entire assembly, reflector or the lens, a large amount of clearance space may be required to keep the headlamp from swinging into other parts. Such movement may eventually result in the complete mechanical failure of the lamp assembly. Moreover, when adjustments in the light beams' pattern are necessary, moving the large mass of the entire lamp assembly may require a longer than desired response time.

Accordingly, there is a need to have an automotive forward lighting assembly that would allow for adjustment of the forward lighting beam without requiring movement of the entire lamp assembly, the lens, or reflector to accomplish the AFS functionality.

SUMMARY OF THE INVENTION

In at least one embodiment of the present invention an AFS headlamp assembly for a vehicle is provided. The AFS headlamp assembly is capable of down the road illumination and peripheral and foreground illumination. The headlamp assembly comprises a housing adapted for stationary mounting to the vehicle. A stationary primary lighting module is disposed within the housing and configured for down the road illumination. A stationary adaptive front lighting module is disposed within the housing, configured for peripheral and foreground illumination and includes a plurality of LED light sources capable of emitting light in response to the vehicle's turning radius and speed.

In at least one embodiment of the present invention a vehicular adaptive front lighting system is provided. The adaptive front lighting system is capable of down the road illumination and peripheral and foreground illumination. The adaptive front lighting system comprises at least one AFS headlamp assembly. The headlamp assembly includes a housing mounted stationary to a vehicle. A stationary adaptive front lighting module is disposed within the housing, configured for peripheral and foreground illumination, and includes a plurality of LED light sources thermally coupled to at least one heat sink and capable of emitting a color temperature light. A stationary primary lighting module is disposed within the housing, configured for down the road illumination, and includes a halogen light source capable of emitting light, wherein the light is filtered by an interference coating to match the color temperature light of the LEDs. The adaptive front lighting system further comprises a controller operably connected to the adaptive front lighting module and configured to illuminate the LEDs in response to the vehicle's turning radius and speed, wherein the adaptive front lighting module increases peripheral and foreground illumination with decreasing turning radii and decreases peripheral and foreground illumination with increasing speed.

DETAILED DESCRIPTION OF EMBODIMENT(S) OF THE INVENTION

Detailed embodiments of the present invention are disclosed herein. It is understood, however, that the disclosed embodiments are merely exemplary of the invention and may be embodied in various and alternative forms. The figures are not necessarily to scale, some figures may be exaggerated or minimized to show the details of the particular components. Therefore, specific structural and functional details disclosed herein are not to be interpreted as limiting, but merely as a representative basis for the claims and/or as a representative basis for teaching one skilled in the art to practice the present invention.

Figure 1:
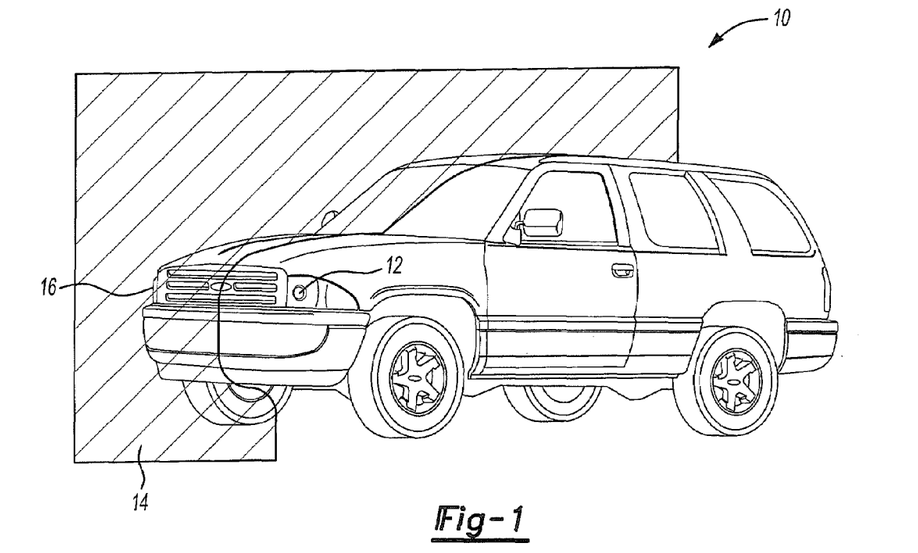
FIG. 1 is a perspective view of a vehicle with an adaptive front lighting system.

Referring to FIG. 1, a perspective view of a vehicle 10 with an adaptive front lighting system is provided. The vehicle 10, may include for example, passenger cars, minivans, SUVs, vans and/or trucks. The driver side AFS headlamp assembly 12 is mounted stationary to the vehicle 10. Symmetrically opposite the driver side AFS headlamp assembly 12 about a longitudinal center plane 14 is the passenger side AFS headlamp assembly 16. The passenger side AFS headlamp assembly 16 is also mounted stationary to the vehicle. The AFS headlamp assemblies 12 and 16 provide down the road illumination, including high and low beam functionality, and peripheral and foreground illumination.

Figure 2:
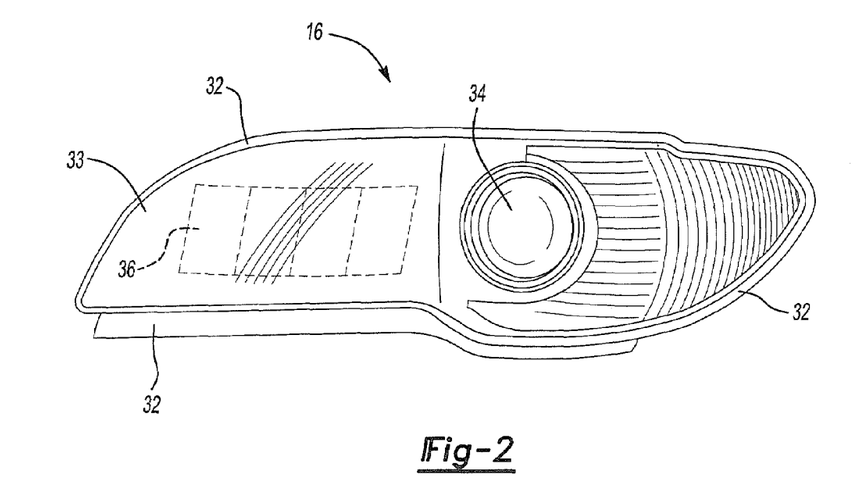
FIG. 2 is a perspective view of an embodiment of an AFS headlamp assembly.

Referring to FIG. 2, a perspective view of an embodiment of an AFS headlamp assembly 16 is provided. The AFS headlamp assembly 16 includes a housing 32, a primary lighting module 34 and an adaptive front lighting module 36.

The housing 32 may for example be made of plastic, such as a polypropylene, TPO, polyester, or any others suitable material known to those skilled in the art. The housing 32 is adapted for stationary mounting to the vehicle 10. For example, threaded fasteners may be used to mount the housing to the vehicle 10. Other suitable means for stationary mounting of the housing 32 to the vehicle 10 may also be used.

The lamp assembly 16 may include an external lens 33 that provides both styling, and structural and/or optical functionality. The external lens 33 may be disposed adjacent to and aligned with an opening in the housing 32. Moreover, the housing 32 may include a glue track with adhesive proximate to its perimeter which bonds the external lens 33 to the housing 32.

The primary lighting module 34 is disposed within the housing 32 and is stationary. The primary lighting module 34 may include a halogen light source. The halogen light source may be for example, a halogen bulb or a bi-halogen projector unit. Alternatively, multiple halogen sources or HID may be used, which may also provide high and low beam functionality.

The halogen light source may include an interference coating disposed on the bulb. Alternatively, an interference coating may be disposed on the external lens 33 or any other suitable medium with which the light from the halogen light source interacts. The interference coating may act to filter the light.

The primary lighting module 34 is configured for down the road illumination. As shown here, a projector style lens may be used to create a light beam. Alternatively, the halogen light source may be configured with a reflector in order to create a light beam. The reflector may be a parabolic and/or faceted reflector or any other suitable reflector known by those skilled in the art. Additionally, an interference shield may be disposed between the halogen light source and the reflector to create a specific beam pattern for down the road illumination and/or to provide high beam and low beam functionality. In at least one embodiment, a movable interference shield is provided. The interference shield may be moveable to an extended position and to a retracted position. In the extended position, the light beam may have a low beam pattern and in the retracted position, the light beam may have a high beam pattern.

The adaptive front lighting module 36 is disposed within the housing 32 and is stationary. The adaptive front lighting module 36 is configured for peripheral and foreground illumination. The stationary adaptive front lighting module 36 includes a plurality of LED light sources capable of emitting light in response to the vehicle's turning radius and speed. The adaptive front lighting module 36 may increase peripheral and foreground illumination with decreasing radii and decrease peripheral and foreground illumination with increasing speed.

The adaptive front lighting module 36 may be comprised of an array or arrays, which include the plurality of LEDs. In one embodiment, the LEDs are included in a plurality of arrays that are horizontal and parallel. The LEDs may be arranged within the array such that some of the LEDs are positioned relative to the longitudinal center plane 14 in a more inboard position while other LEDs may be positioned in a more outboard position.

The LEDs radiate with a specific spectral power distribution that represents a color temperature. The interference coating may filter light from the primary lighting module 34 to more closely match the color temperature of the LEDs. For example, a halogen light source may emit an orange-white light, which is filtered by the interference coating to closely match a blue-white color temperature light of the LEDs.

Figure 3:
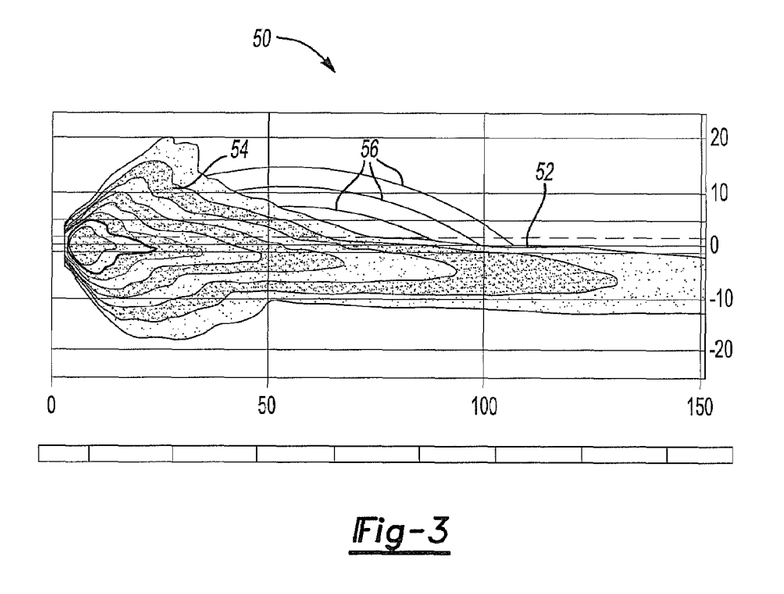
FIG. 3 is an exemplary plan view diagram of a beam pattern for an AFS headlamp assembly in accordance with one embodiment of the present invention.

Referring to FIG. 3, an exemplary plan view of a beam pattern for an AFS headlamp assembly is provided. The beam pattern 50 includes down the road illumination 52 and peripheral and foreground illumination 54. Down the road illumination 52 may be for a low beam and/or a high beam pattern. Down the road illumination 52 originates substantially from the stationary primary lighting module 34 of the headlamp assembly 16. The peripheral and foreground illumination 54 may be enhanced substantially from the adaptive front lighting module 36. For example, the peripheral and foreground illumination 54 may expand into augmented peripheral and foreground positions 56 as a result increased illumination from the adaptive front lighting module 36.

Figure 4:
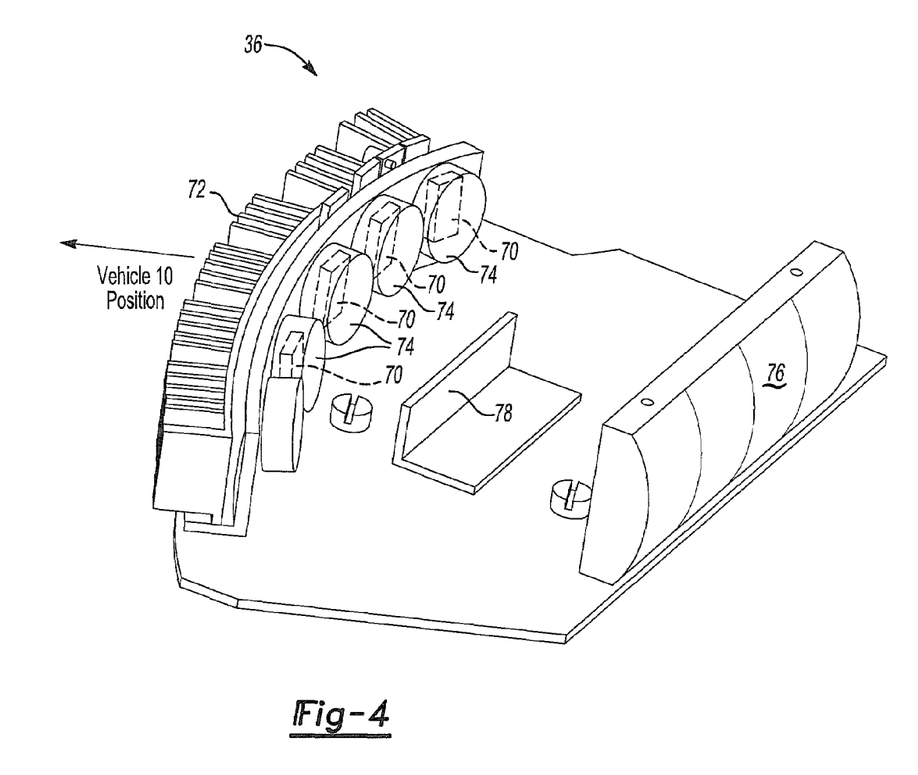
FIG. 4 is a perspective view of an embodiment of an adaptive front lighting module.

Referring to FIG. 4, a perspective view of an adaptive front lighting module 36 in accordance with one embodiment of the present invention is provided. An adaptive front lighting module 36 includes a plurality of LED light sources 70. The LED light sources 70 may have a color temperature specific to the type of LED light source used.

The LED light sources 70 may be configured in an array, which may be positioned in a substantially horizontal plane. The array may have an inboard end and an outboard end relative to the longitudinal center plane 14. In at least one embodiment and as shown here, the array may have a substantially convex geometry relative to the vehicle 10. The convex geometry may create a real focal point from the emitted LED light allowing for modularity of the adaptive front lighting module 36 as a cornering lamp.

In at least one other embodiment, the array is positioned in a substantially concave geometry relative to the vehicle 10.

The concave geometry may creates a virtual focal point from the emitted LED light allowing for modularity of the adaptive front lighting module 36 as a cornering lamp.

In all of the embodiments described above, each LED light source 70 is mounted stationary with respect to housing 32 and is aimed to produce a light beam directed at a fixed angle relative to longitudinal center plane 14. The terms "stationary" and "fixed" as used herein mean that the nouns modified by those adjectives do not move or vary over time, nor are the elements movable or variable in response to any signals or instructions received from any sensor or control device. LEDs 70 making up an array are mounted in a configuration to form a range of different beam angles, as may be best seen in FIG. 4.

The plurality of LED light sources 70 may be coupled or respectively coupled to a heat sink or heat sinks 72. The heat sink 72 may preferably be made of a material with a relatively high thermal conductivity and/or thermal diffusivity, such as for example, a metal or a metal impregnated polymer. The shape of the heat sink 72 in one embodiment includes a fin structure that allows for efficient heat dissipation. The heat sink 72 may also be thermally coupled to the LEDs 70 by a thermally conductive adhesive disposed between the heat sink 72 and the LEDs 70.

Mini-projection and/or projection lenses 74 may be respectively aligned and matched with each of the LEDs 70. The mini-projection lenses 74 may be configured to collect and collimate the light. The mini-projection lenses 74 may be made of suitable materials known in the art to withstand the higher LED temperatures and to provide appropriate optical properties.

In one embodiment which includes the array of LEDs in a substantially convex geometry relative to the vehicle 10, a parabolic lens 76 is aligned with the mini-projection lenses 74 to direct and spread the collimated light. The parabolic lens 76 may be for example, a cylindrical projection lens. The parabolic lens 76 may provide directing and spreading functionality to the collimated light. A cut-off shield 78 may be disposed between the mini-projection lenses 74 and the parabolic lens 76 and configured to create a peripheral and foreground beam pattern.

Figure 5:
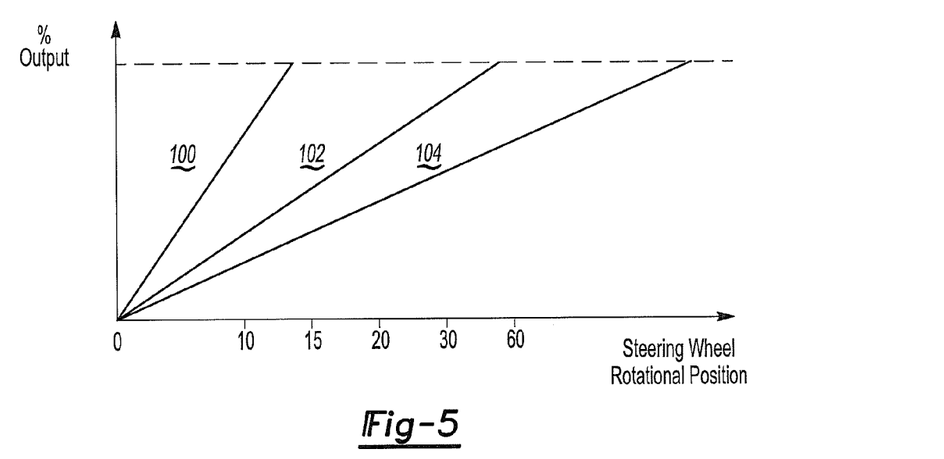
FIG. 5 is an exemplary diagram of percent light emitted by a plurality of LEDs of the adaptive front lighting module as a function of steering wheel rotational position in accordance with one embodiment of the present invention.

Referring to FIG. 5, a diagram of percent light emitted by the respective LEDs of the adaptive front lighting module 36 as a function of a steering wheel rotational position according to one embodiment is provided. The steering wheel rotational position inversely relates to the vehicle turning radius. For example, a steering wheel rotational position of "0" corresponds to a turning radius of infinity which is a straight line. Moreover, as the steering wheel rotation position increase, the turning radius of the vehicle decreases such that the maximum steering wheel rotational position corresponds to the smallest vehicle turning radius.

Line 100, 102 and 104 respectively represents a first, second and third LED in an array of LEDs included in the adaptive front lighting module 36. Each LED 100, 102 and 104 is mounted stationary within housing 32 and configured to form a peripheral light beam having a respective beam angle that is fixed relative to the longitudinal center plane 14, seen in FIG. 1. The peripheral and foreground beam pattern comprises the respective beams from each of these LEDs 100, 102 and 104. The first LED 100 has a smaller beam angle than the second LED 102, which has a smaller beam angle than the third LED 104. The first LED 100 emits more light at a larger turning radius of the vehicle or smaller steering wheel rotational position than the second or third LEDs 102 and 104. Moreover, the LEDs 100, 102 and 104 increasingly emit light with decreasing turning radii.

Figure 6:
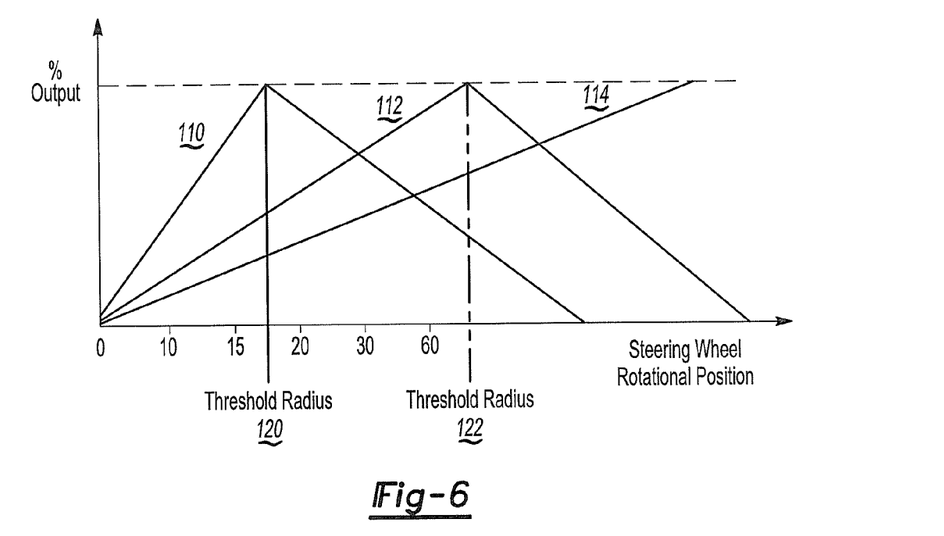
FIG. 6 is an exemplary diagram of percent light emitted by the plurality of LEDs of the adaptive front lighting module as a function of steering wheel rotational position in accordance with one embodiment of the present invention.

Referring to FIG. 6, a diagram of percent light emitted by the respective LEDs of the adaptive front lighting module 36 as a function of steering wheel rotational position according to one embodiment is provided. Line 110, 112 and 114 respectively represent a first, second and third LED in an array of LEDs included in the adaptive front lighting module 36. Each LED 110, 112 and 114 is configured to form a peripheral light beam having a respective beam angle relative to the longitudinal center plane 14, seen in FIG. 1. The peripheral and foreground beam pattern comprises the respective beams from each of these LEDs 110, 112 and 114. The first LED 110 has a smaller beam angle than the second LED 112 which has a smaller beam angle than the third LED 114.

The first LED 110 increasingly emits light with decreasing turning radii for turning radii larger than a threshold radius 120. The first LED 110 decreasingly emits light with decreasing radii for turning radii smaller than the threshold radius 120. Additionally, the second LED 112 increasingly emits light with decreasing turning radii for turning radii larger than a threshold radius 122. The second LED 112 decreasingly emits light with decreasing radii for turning radii smaller than the threshold radius 122.

Figure 7A:
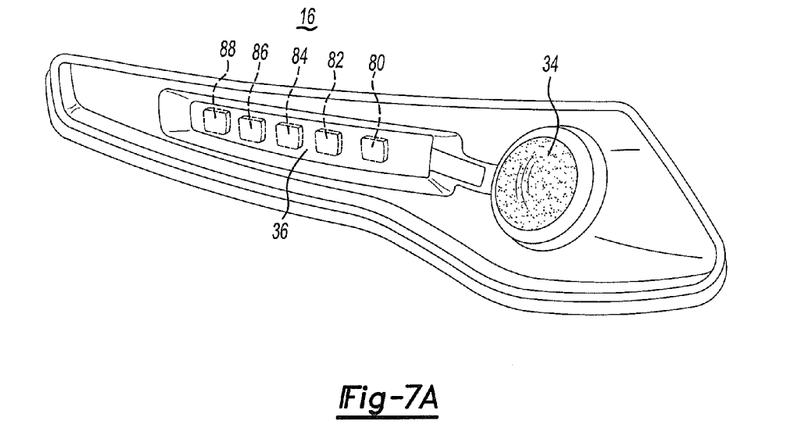
FIG. 7a is a perspective view of an AFS headlamp assembly in accordance with an embodiment of the present invention.
Figure 7B:
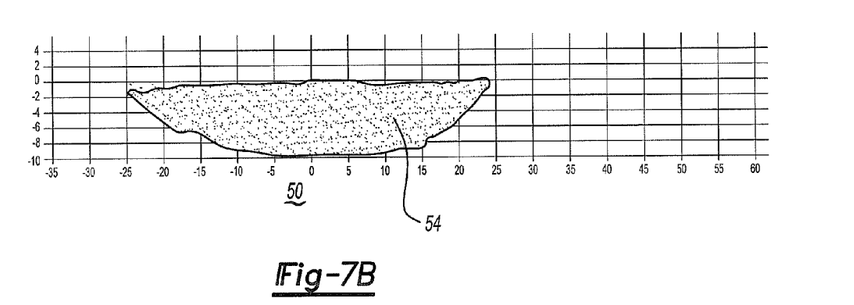
FIG. 7b is a rear view of the respective beam patterns in accordance with an embodiment of the present invention.
Figure 7C:
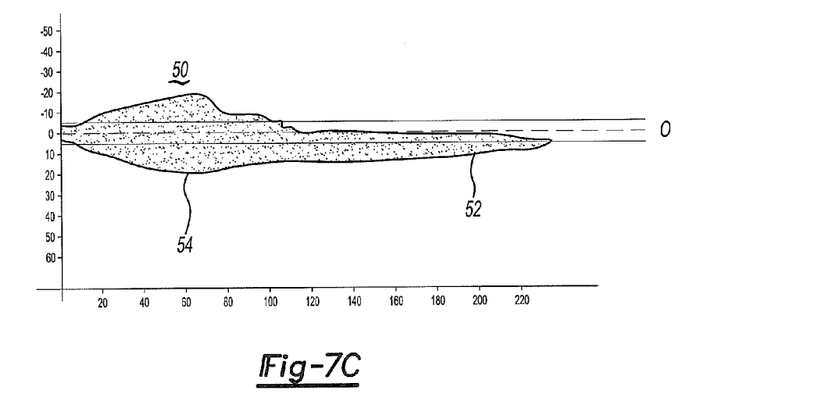
FIG. 7c is a plan view of the respective beam pattern in accordance with an embodiment of the present invention.

Referring to FIGS. 7a, 7b and 7c. FIG. 7a is a perspective view of an embodiment of an AFS headlamp assembly. FIG. 7b is a rear view of the respective beam patterns and 7c is a plan view of the respective beam patterns according to an embodiment of the present invention. In FIG. 7a, the headlamp assembly 16 illustrates illumination of the primary lighting module 34 only. This response is exemplary of the vehicle traveling in a substantially straight direction. The respective beam patterns 50 are shown in FIGS. 7b and 7c, which illustrate the position of the peripheral and foreground illumination 54.

Figure 8A:
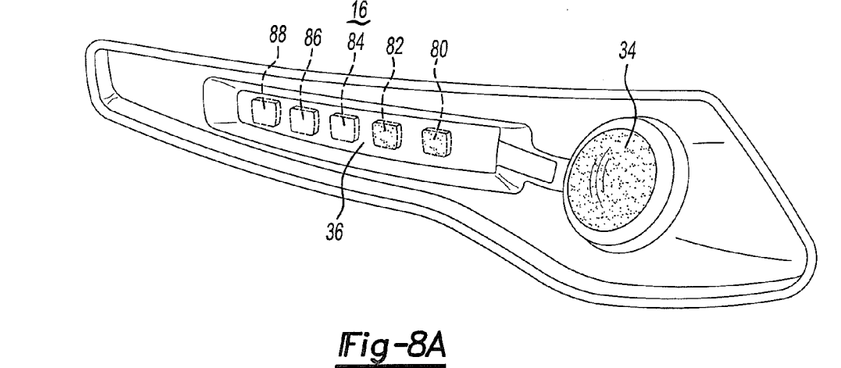
FIG. 8a is a perspective view of an AFS headlamp assembly in accordance with an embodiment of the present invention.
Figure 8B:
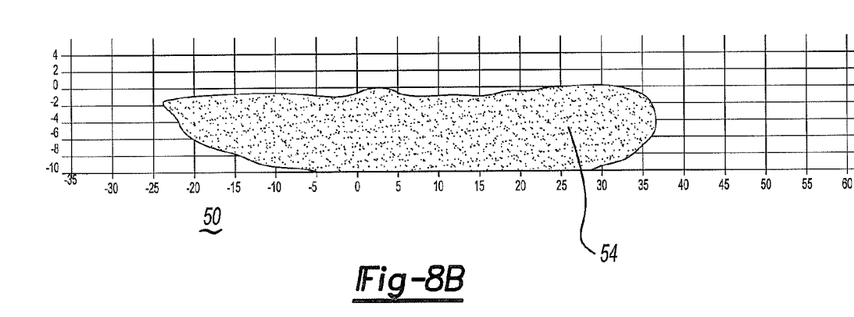
FIG. 8b is a rear view of the respective beam patterns in accordance with an embodiment of the present invention.
Figure 8C:
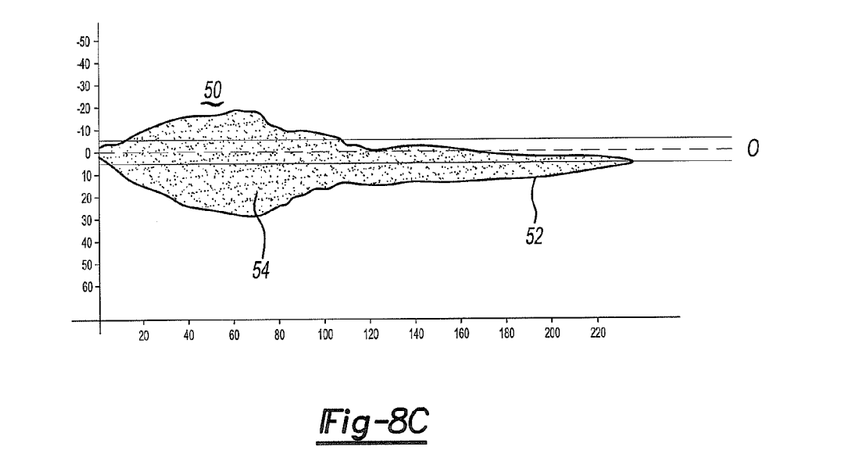
FIG. 8c is a plan view of the respective beam pattern in accordance with an embodiment of the present invention.

Referring to FIGS. 8a, 8b and 8c. FIG. 8a is a perspective view of an embodiment of an AFS headlamp assembly. FIG. 8b is a rear view of the respective beam patterns and FIG. 8c is a plan view of the respective beam patterns according to an embodiment of the present invention. In FIG. 8a, the headlamp assembly 16 illustrates illumination of the primary lighting module 34 and the first and second LED 80 and 82 of the adaptive front lighting module 36 in response to a turning radius. Comparing FIGS. 7b and 7c to FIGS. 8b and 8c, an increase in the foreground and peripheral illumination is evidenced from the expansion of the beam pattern 50 about area 54, as illustrated in FIGS. 8b and 8c.

Figure 9A:
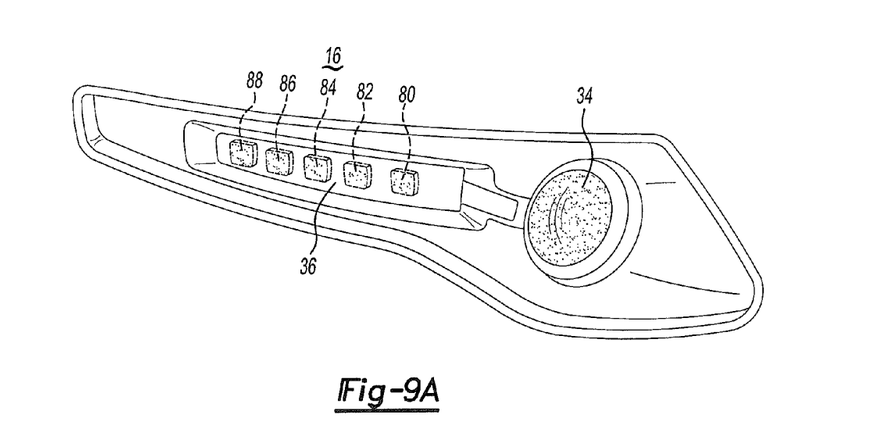
FIG. 9a is a perspective view of an AFS headlamp assembly in accordance with an embodiment of the present invention.
Figure 9B:
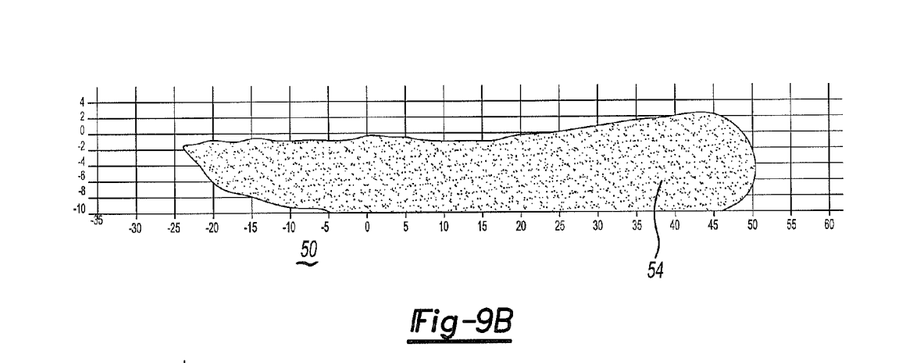
FIG. 9b is a rear view of the respective beam patterns in accordance with an embodiment of the present invention.
Figure 9C:
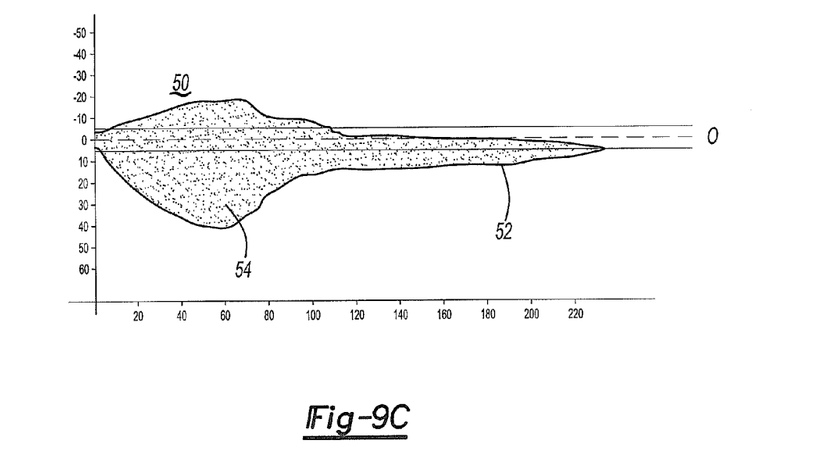
FIG. 9c is a plan view of the respective beam pattern in accordance with an embodiment of the present invention.

Referring to FIGS. 9a, 9b and 9c. FIG. 9a is a perspective view of an embodiment of an AFS headlamp assembly. FIG. 9b is a rear view of the respective beam patterns and FIG. 9c is a plan view of the respective beam patterns according to an embodiment of the present invention. In FIG. 9a, the headlamp assembly 16 illustrates illumination of the primary lighting module 34 and all five LEDs 80, 82, 84, 86 and 88 of the adaptive front lighting module 36 in response to a "cornering" turning radius which is smaller than the turning radius exemplified in FIGS. 8a-c. Comparing FIGS. 9b and 9c to FIGS. 7b, 7c, 8b and 8c, a further increase in the foreground and peripheral illumination is evidenced from the expansion of the beam pattern 50 about area 54, as illustrated in FIGS. 9b and 9c.

Figure 10:
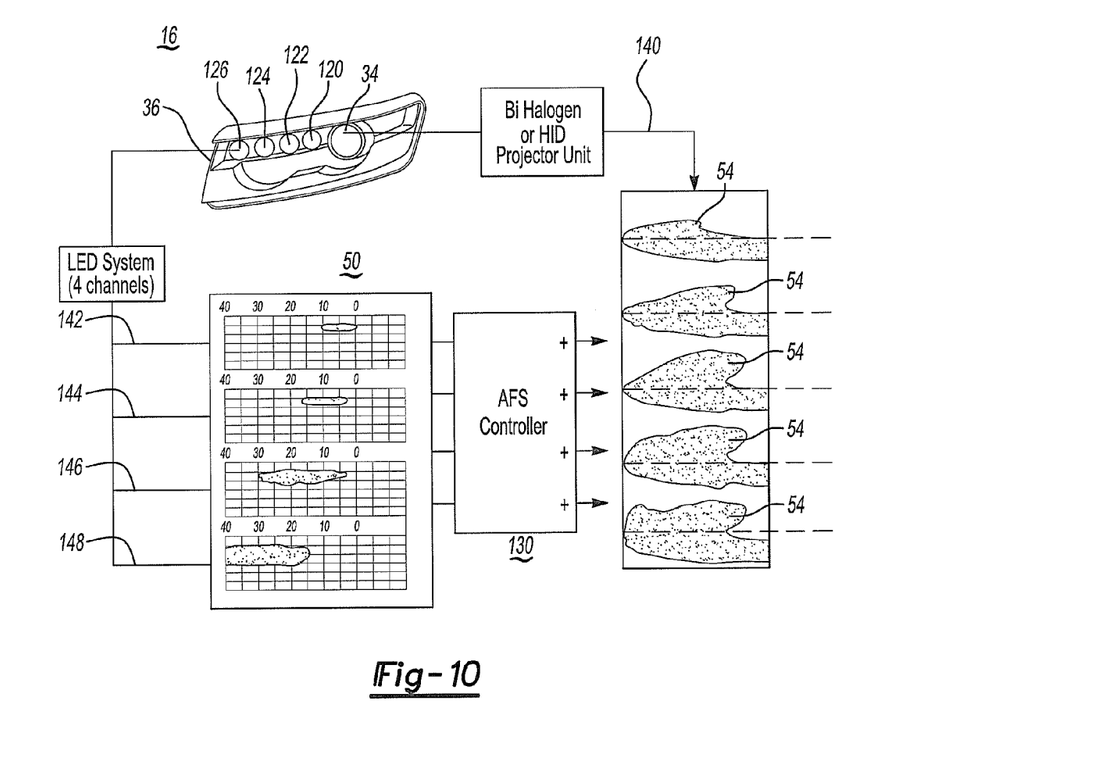
FIG. 10 is a perspective view of an adaptive forward lighting system including rear and plan views of respective beam patterns corresponding to various light source illumination in accordance with an embodiment of the present invention.

Referring to FIG. 10, a perspective view of an adaptive forward lighting system including rear and plan views of respective beam patterns corresponding to various LED light source illuminations according to an embodiment of the present invention is provided. The adaptive forward lighting system includes an AFS headlamp assembly 16 comprising a stationary primary lighting module 34, including a light source such as, for example, a bi-halogen projector unit or a HID, and a stationary adaptive front lighting module 36, including for example, four LEDs with respective projection lens optics 120, 122, 124 and 126 arranged in a concave array relative to a vehicle position, and a controller 130.

The controller 130 is operably connected to the adaptive front lighting module 36 and configured to illuminate the LEDs 120, 122, 124 and 126 in response to the vehicle's turning radius and speed producing in part respective beam pattern views 142, 144, 146 and 148. The controller 130 may be a computer or other logical device which executes application programs and/or which perform other logical exercises.

The inboard LED 122 illuminates at a larger turning radius than the outboard LED 126. At decreasing turning radii the outboard LED 126 emits light and/or may increasing emit light. The beam pattern 50 is effected accordingly with an increase in peripheral and foreground illumination, as evidenced from the expansion of area 54 in views 140-148.

While the best mode for carrying out the invention has been described in detail, those familiar with the art to which this invention relates will recognize various alternative designs and embodiments for practicing the invention that are within the scope of following claims.

What is claimed:

1. An adaptive front lighting system for a vehicle, the system comprising:
    a housing adapted for stationary mounting to the vehicle;
    a stationary primary lighting module mounted stationary within the housing and configured for down the road illumination; and
    an stationary adaptive front lighting module mounted stationary within the housing and including an array comprising at least a first LED and a second LED, each of the first and second LEDs mounted stationary with respect to the housing and configured to forming a peripheral light beam having a respective beam angle that is fixed relative to a longitudinal center plane of the housing, the first LED having a smaller beam angle than the second LED; and
    a controller operably connected to the adaptive front lighting module and independently varying the amount of light emitted by the first and second LEDs in response to a vehicle turning radius.

2. The system of claim 1 wherein the controller further varies the amount of light emitted by the first and second LEDs in response to a vehicle speed.

3. The system of claim 1 wherein the LEDs are in an array having an inboard end closest to a longitudinal center plane of the vehicle and an opposite outboard end.

4. The system of claim 3 wherein the LEDs are in a plurality of substantially horizontal and parallel arrays.

5. The system of claim 3 wherein the array is substantially concave relative to the vehicle and the adaptive front lighting module further includes a plurality of projection lenses respectively matched and aligned with the LEDs such that the light emitted passes through the projection lenses and is collimated.

6. The system of claim 3 wherein the array is substantially convex relative to the vehicle.

7. The system of claim 6 wherein the adaptive front lighting module further includes a plurality of mini-projection lenses and a parabolic lens, wherein the mini-projection lenses are respectively matched and aligned with the LEDs so that the light emitted passes through the mini-projection lenses and is collimated and the parabolic lens is aligned with the mini-projection lenses to direct and spread the collimated light.

8. The system of claim 7 wherein the adaptive front lighting module further includes a cut-off shield disposed between the mini-projection lenses and the parabolic lens, the cut-off shield is configured to create a peripheral beam pattern.

9. The system of claim 1 wherein the first LED emits more light than the second LED at a larger turning radius.

10. The system of claim 9 wherein the first LED increasingly emits light with decreasing turning radii for turning radii larger than a threshold radius, and the first LED decreasingly emits light with decreasing radii for turning radii smaller than the threshold radius.

11. The system of claim 1 wherein the primary light module includes a halogen light source capable of emitting light.

12. The system of claim 11 wherein the primary light module further includes a projector lens aligned with the halogen light source so that the light emitted passes through the projector lens and creates a light beam.

13. The system of claim 11 wherein the primary light module further includes an interference shield and a primary reflector which are configured to create a light beam.

14. The system of claim 13 wherein the interference shield is movable to an extended position and to a retracted position, where in the extended position, the light beam has a low beam pattern and in the retracted position, the light beam has a high beam pattern.

15. The system of claim 11 wherein the light emitted from the LEDs have a color temperature and the light emitted from the halogen light source is filtered by an interference coating to match the color temperature.

16. An adaptive front lighting system for a vehicle, the adaptive front lighting system comprising:
    at least one AFS headlamp assembly comprising:
        a housing mountable stationary to the vehicle;
        an stationary adaptive front lighting module mounted stationary within the housing and including at least a first LED and a second LED capable of emitting a color temperature light, each of the first and second LEDs mounted stationary with respect to the housing and configured to forming a peripheral light beam having a respective beam angle that is fixed relative to a longitudinal center plane of the housing, the first LED having a smaller beam angle than the second LED; and
        a stationary primary lighting module disposed mounted stationary within the housing and including a halogen light source; and
    a controller operably connected to the adaptive front lighting module and configured to individually vary the amount of light emitted by the first and second LEDs in response to the vehicle's speed.

17. The adaptive front lighting system of claim 16 wherein the LEDs are in an array having an inboard end closest to a longitudinal center plane of the vehicle and an opposite outboard end.

18. The adaptive front lighting system of claim 17 wherein the controller is further configured to individually vary the amount of light emitted by the first and second LEDs in response to a turning radius of the vehicle, the first LED emitting more light at a larger turning radius than the second LED, wherein the first and second LED increasingly emit light with decreasing turning radii.

19. The adaptive front lighting system of claim 18 wherein the first LED increasingly emits light with decreasing turning radii for turning radii larger than a threshold radius, and the first LED decreasingly emits light with decreasing radii for turning radii smaller than the threshold radius.

20. An automotive vehicle having an adaptive front lighting system comprising:
  at least one adaptive front lighting headlamp assembly comprising:
    a housing mounted stationary with respect to the vehicle;
    a primary lighting module disposed within and mounted stationary with respect to the vehicle; and
    an adaptive front lighting module disposed within the housing and including an array comprising at least a first LED and a second LED, each of the first and second LEDs mounted stationary with respect to the vehicle so as to form a peripheral light beam having a respective beam angle that is fixed relative to a longitudinal center plane of the vehicle, the first LED having a smaller beam angle than the second LED; and
  a controller operably connected to the adaptive front lighting module and independently varying the amount of light emitted by the first and second LEDs in response to a vehicle turning radius.

* * * * *